United States Patent [19]
Hauser

[11] Patent Number: 5,489,951
[45] Date of Patent: Feb. 6, 1996

[54] PROJECTION APPARATUS FOR CREATING VISIBLE IMAGES

[76] Inventor: Jeffrey Hauser, 3414 Pine Haven Cir., Boca Raton, Fla. 33431

[21] Appl. No.: 406,167

[22] Filed: Mar. 17, 1995

[51] Int. Cl.$^6$ ............................... H04N 5/74; H04N 9/31
[52] U.S. Cl. ......................... 348/744; 348/756; 348/816
[58] Field of Search ................................ 348/744, 756, 348/750, 780, 781, 816, 757, 815, 758, 779, 776, 381, 739, 760, 754; 359/649, 244, 651, 245, 583, 237, 443, 242; H04N 5/74, 9/31

[56] References Cited

FOREIGN PATENT DOCUMENTS

WO94030018  12/1994  United Kingdom ............. H04N 9/31

Primary Examiner—James J. Groody
Assistant Examiner—Nina N. West
Attorney, Agent, or Firm—Robert M. Downey

[57] ABSTRACT

A projection apparatus creates laser generated visible images utilizing the interference of light principle, and includes individual laser projection devices, positioned and disposed in opposite sets, each structured to emit a select color laser beam which is modified and split by optical phase modulators and beam splitters, respectfully, to form an array of beams which intersect with beams from the oppositely disposed laser projectors to produce the desired multicolored image. The apparatus is supported above or below the desired area of the generated image with the laser devices mounted on computer controlled motorized swivel mounts, providing the capability to selectively locate the produced images at various preprogrammed locations within a defined area.

2 Claims, 2 Drawing Sheets

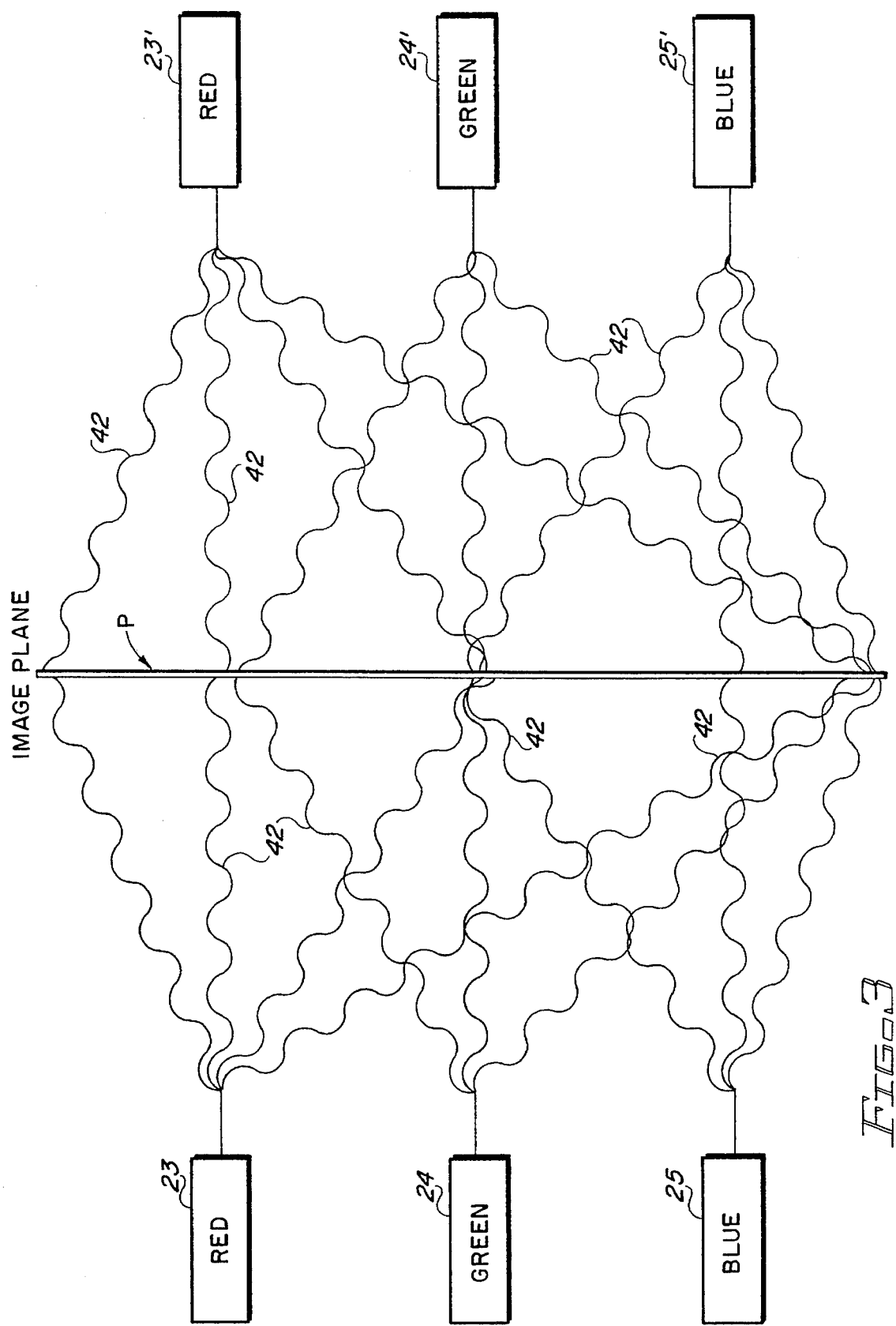

1

PROJECTION APPARATUS FOR CREATING VISIBLE IMAGES

BACKGROUND OF THE INVENTION

1. Field of the Invention

The present invention relates to a projection apparatus and more particularly, to a projection apparatus having a plurality of laser projecting devices for creating visible images without the use of a projection surface.

2. Description of the Related Art

Video display devices play an integral role in our daily lives. Televisions, computer video monitors, CAD/CAM systems and modern communications systems, such as video telephones and teleconference systems, are examples of commonly used video display devices. However, existing devices are limited in their ability to vary the location and size of the image and different display devices are generally required for different applications.

Accordingly, there is a need in the video industry for an apparatus which is adapted to provide a video display in a manner not previously known by providing laser generated visible images without the use of a projection surface, wherein the image may be displayed at various preprogrammed locations and the size of the image may be readily changed without compromising the quality of the image.

SUMMARY OF THE INVENTION

The present invention relates to a projection apparatus for creating visible images which utilizes the interference of light principle for construction of its image. The apparatus includes two sets of color laser projectors. Each set includes separate red, green, and blue laser projection devices. The sets of laser projectors are set up directly opposite each other with each color laser projector within one set directly across from its counterpart of the same color in the other set. An optical phase modulator modifies the stream of photons emitted by each laser so that the beams emitted from lasers in opposite sets are 100% in phase with each other at the point of intersection, thereby forming a point of visible light. The modulator also ensures that certain select beams emitted from the laser projection devices are 100% out of phase with respect to each other at points of intersection, between the laser projectors and the interference plane, so that no undesired points of visible light are formed, which may otherwise result in distortion or a reduction in resolution. A beam splitter splits the beam emitted by each laser projection device into multiple laser beams to form an array of single-color beams. The split laser beams from the opposite sets of projection devices intersect at the interference plane at predetermined points to form a multi-colored image in somewhat the same manner that the three primary colored projectors are used in a projection screen television, except there is no projection surface. Each laser projection device and its associated optical phase modulator and beam splitter may be supported at a location near the desired location of the image or mounted to a motorized swivel mounting which is computer controlled to form the image at various preprogrammed locations. The size of the image may be varied and the image may be inverted for ceiling mounting of the hardware.

With the foregoing in mind, it is an object of the present invention to provide a projection apparatus which creates laser generated visible images in air, without the need of a projection surface.

It is another object of the present invention to provide a projection apparatus which can be used in any video application, including television, computer displays, video teleconference systems, and theaters.

It is yet another object of the present invention to provide a projection apparatus which is adapted to be supported in various locations and capable of displaying images in select locations within a predetermined display area.

It is a further object of the present invention to provide a projection apparatus adapted to generate a visible image without the need of a projection surface and including means for selectively moving the location of the generated image within a predetermined display area.

It is yet a further object of the present invention to provide a projection apparatus with computer controlled means for controlling the generation and movement of the image.

These and other objects and advantages of the present invention will become more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 3 is a schematic diagram showing the relative wave phases of the three primary colored laser beams emitted by the laser projecting devices.

Like reference numerals refer to like parts throughout the several views of the drawings.

DETAILED DESCRIPTION OF THE PREFERRED EMBODIMENT

Figure 1:
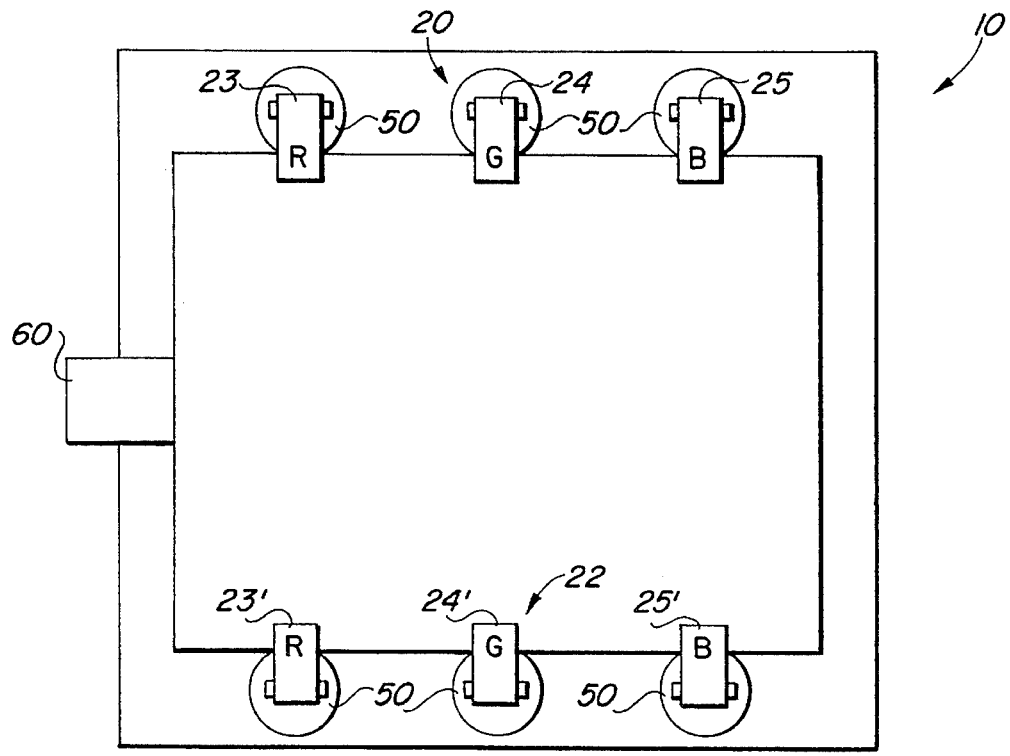
FIG. 1 is a top plan view of the projection apparatus of the present invention.
Figure 2:
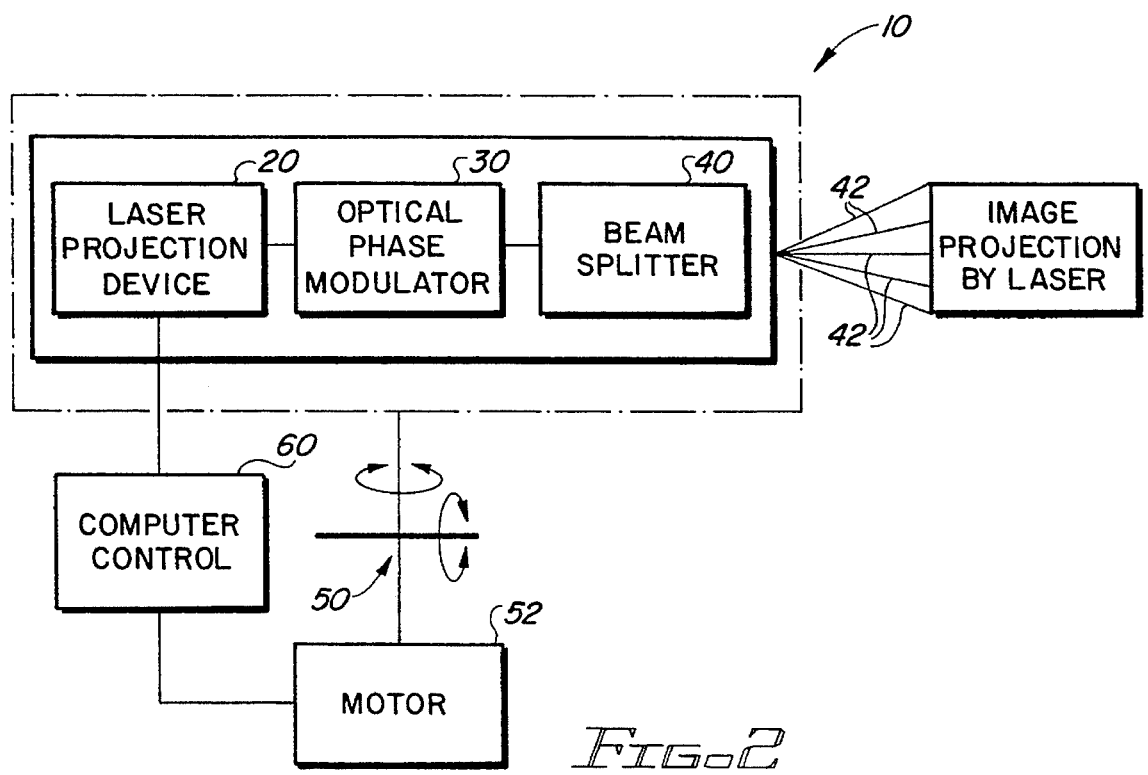
FIG. 2 is a functional block diagram showing a laser projecting device including an optical phase modulator and beam splitter mounted on a swivel and movably driven thereon by a motor.

With reference to FIGS. 1–3, the present invention is directed to a projection apparatus for creating visible images, generally indicated as 10, including a first set of colored laser projectors 22 positioned and disposed directly opposite and in confronting relation to each other. Each set of lasers 20 and 22 includes a plurality of individual high-focus laser projection devices 21 of red 23, 23', green 24, 24', or blue 25, 25' color, each structured to generate and emit a focused stream of photons in the form of a laser beam of the particular color associated with that laser projector. Each colored laser projector 23, 24 and 25 in the first set 20 is positioned and disposed directly across from its color counterpart 23', 24' and 25' in the second set 22 so that the emitted laser beams of one set intersect with predetermined beams of the other set at a desired point in space along an intersection plane P.

An optical phase modulator 30 is positioned at the output of each laser projection device 21 so that the generated laser beam is directed through the modulator 30. As shown in FIG. 3, the modulator 30 modifies the stream of photons emitted by each laser projection device 21 so that the beams emitted from each colored laser 23, 24 and 25 in the first set 20 are 100% in phase with the beams emitted from the colored lasers 23', 24' and 25' in the second set 22 at the point of intersection along the intersection plane P. This maximizes the number of photons going through the point of intersection of two beams at the intersection plane P, thereby maximizing the number of collisions between photons and scattering enough photons at the point of intersection to form a point of light visible to the human eye. The modulator 30 further modifies the stream of photons so that beams emitted from different laser projection devices of the same set are out of phase with respect to each other at points of cross-over and intersection before the intersection plane P, thereby minimizing the interference and scattering between photons prior to the intersection plane. As shown in FIG. 3, this is accomplished by having beams emitted from each of the laser projection devices in a set 100% out of phase with respect to the other beams emitted from the laser projection devices in the same set. Modulating the beams emitted from different laser projectors in a set to be less than 100% out of phase with respect to each other at points of intersection between the projection devices and the image plane may result in degradation and distortion of the image. To accomplish generation of complex colors, the beams from two or more of the laser projectors in a set, along with the beams from at least one projector of the opposing set, intersect at the image intersection plane with all beams being 100% in phase at the point of intersection where the complex color is desired.

A beam splitter 40 is positioned at the output of each optical phase modulator 30 so that the laser beam is directed through the splitter 40. The splitter 40 splits the single laser beam into a plurality of laser beams 42 to form a predetermined array of beams of a single color. Each of the split laser beams is analogous to a pixel on a computer screen or color dot on the phosphor screen of a television. The split beams from the three primary colors of the opposite sets intersect at predetermined intersection points along the intersection plane P to form a multi-colored image in much the same manner that three primary colored projectors are used in a projection screen television.

Each laser projection device 21 and its associated optical phase modulator 30 and beam splitter 40 may be supported at a location near the desired location of the created image and may be further mounted to a motorized swivel mounting 50 driven by a motor 52 so that the direction of the array of laser beams and the resultant location of the created image may be readily changed. Further, computer control means 60 may be provided for controlling the movement of the motorized swivel mounting 50 and motor 52 so that movement of the image location may be preprogrammed. The computer control means 60 further controls operation of the laser projection devices 21, along with the optical phase modulator and beam splitter, to selectively control and direct the emitted array of laser beams. The image may be inverted, with the lasers 21, modulators 30 and splitters 40 mounted to a ceiling or overhead structure, thereby providing a convenient location to support the equipment of the apparatus.

The present invention can be utilized for many different applications. For instance, it can be used to replace any currently existing video display device including televisions and computer video monitors. The projection apparatus can also be used in CAD/CAM systems to produce a scalded image of a product being designed for manufacture. This enables the image to be manipulated so that the product can be inspected from different viewpoints and modified as if it were a physical object. It can also be used in video telephones, without a screen, to produce a life size image of the person on the phone, thereby making it seem as if the person was actually in the room. Furthermore, the size of the image may be changed without compromising the solidity of the image.

While the invention has been shown and described in what is considered to be a practical and preferred embodiment, it is recognized that departures may be made within the spirit and scope of the following claims which, therefore, should not be limited except within the Doctrine of Equivalents.

Now that the invention has been described,

What is claimed is:

1. A projection apparatus for creating visible images comprising:

a plurality of individual high-focus laser projection devices positioned and disposed in opposite first and second sets and including corresponding pairs defined by opposing ones of said laser devices in said first and second sets, each of said laser projection devices being structured to generate and emit a focused stream of photons therefrom to define a laser beam of a predetermined one of a plurality of primary colors, each of said laser projection devices including an optical phase modulator for modifying the stream of photons emitted therefrom to avoid interference of said laser beams before reaching an intersection plane and to ensure said laser beams are 100% in phase at a predetermined intersection point, a beam splitter fitted to each of said laser projection devices for splitting the laser beam emitted from each of the respective laser projection devices into a plurality of laser beams to form a predetermined array of laser beams of the predetermined primary color, means for supporting each of said laser projection devices of said first and second sets so that said laser projection devices of said corresponding pairs are positioned and disposed in opposing relation to one another, directional means for individually moving each of said laser projection devices so as to selectively direct the array of laser beams emitted therefrom, computer control means for controlling said directional means and selective activation of said laser projection devices in accordance with preprogrammed commands so that individual ones of said laser beams in said array emitted from said laser projection devices in said first set intersect with select individual ones of said laser beams in said array emitted from said laser projection devices in said second set at said predetermined intersection plane, and whereby intersection of the plurality of laser beams from said first and second sets of said laser projection devices results in formation of a multi-colored image.

2. A projection apparatus for creating visible images as recited in claim 1 wherein said directional means includes a motorized swivel mounting structured to rotate each of said laser devices, thereby repositioning the location of an image formation.

* * * * *